Feb. 2, 1932. G. A. JOHNSON 1,843,561
ELECTRIC CABLE
Filed April 10, 1930
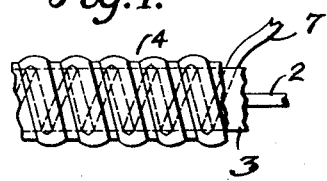
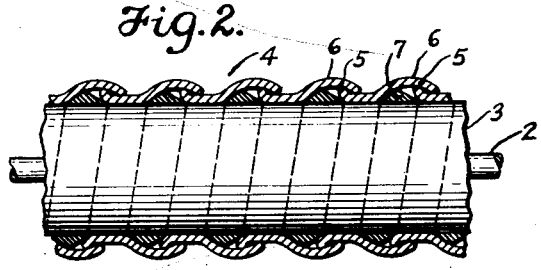
INVENTOR
Gustave A. Johnson
BY
ATTORNEY Patented Feb. 2, 1932

1,843,561

UNITED STATES PATENT OFFICE

GUSTAVE A. JOHNSON, OF IRVINGTON, NEW JERSEY

ELECTRIC CABLE

Application filed April 10, 1930. Serial No. 443,018.

This invention relates to electric cables, and more particularly to flexible armored cable such as is used for house-wiring.

The general object of the invention is to provide a cable which can be sold more cheaply than ordinary cable of this type, which is of greatly reduced diameter, and which permits of much cheaper installations.

Instead of having two insulated wires inside the armor, one to constitute the live wire and the other the return wire, it has been proposed to use a single insulated wire or conductor and a bare return wire, in consequence of which the cost and the size of the cable are reduced, but in the only instance of such a cable with which I am familiar the bare return wire was laid longitudinally alongside the insulated conductor, whereas in accordance with one part of this invention the return wire is disposed helically with the armor and in an internal channel or recess thereof.

Where the return wire is placed lengthwise between the armor and the insulation of the live wire, the return wire is forced into the insulation by the operation of winding the armor about the conductors and impairment of the insulation may result. Furthermore, when the cable is bent, the return wire resists the bending and is forced further into the insulation if it is at the outer side of the bend, while if it is at the inner side it is buckled and tends because of that to injure the insulation.

The return wire of the cable disclosed herein is laid helically with the armor in connection with the operation of winding the armor about the insulated wire, and lies in a groove in the inner surface of the armor, between and in contact with the armor and the insulation of the positive conductor. The armor is of that type made by spirally wrapping a metal strip so that the convolutions overlap, the strip being so formed that the overlapping convolutions interlock in a manner which enables the armored cable to be readily bent.

The disposition of the bare neutral or return conductor in contact with the insulation but accommodated, partly or entirely, within a helical groove saves the insulation from serious local compression.

The return wire need not be relied on for the entire current-carrying capacity which is required, since the current-carrying capacity of the armor in contact with the return conductor can be utilized. The size of the return conductor may be varied. It may be of smaller cross-sectional area than the positive conductor if the current-carrying capacity of the armor is sufficient.

In the accompanying drawings forming part hereof:

Fig. 1 is a side elevation of a portion of a cable embodying the invention in its preferred form, the parts of the cable being broken away to show the insulation and the positive wire projecting successively, and a portion of the return wire also being shown projecting; and Fig. 2 is a longitudinal section on a larger scale through the armor and the return wire, the insulation about the positive wire being in elevation.

In Figs. 1 and 2 the positive wire 2 is surrounded by insulation 3 of the kind customarily employed or of any suitable kind, and the armor 4 is wound about this insulation.

The armor is of that type made from a metal strip which is passed through a forming die and wound helically about the conductor, the convolutions overlapping each other and the overlapping portions being given a formation which prevents pulling apart. One half, more or less, of the width of the strip may be substantially flat and terminate in an outwardly directed lip 5, while the other half, more or less, is formed with a crest 6, the crest of one convolution hooking over the lipped portion of the other convolution. The precise form and proportions of the strip and the precise manner in which the convolutions engage each other to secure a flexible interlock are subject to variation.

The form and relation of the convolutions are preferably such as to afford a pronounced helical groove in the inner surface of the tubular armor, and this recess is utilized as a channel in which to lay the return wire 7, so that the insulation is relieved to a considerable extent, or altogether, of local pressure due to the presence of this wire.

The wire 7 is advantageously made of such cross-section, preferably approximately triangular, as to present a flat base, or approximately flat base, to the insulation, at the same time fitting into the helical groove. As illustrated, the base of the wire can lie substantially even with the portions of the inner surface of the armor between the spaced convolutions of the wire.

The area of the bare return conductor may be such as to develop the full carrying capacity of the armor, though it is not essential that complete advantage be taken of the armor as an element of the conductor.

It is simple to introduce the return wire and to wind it in conjunction with the winding of the armor strip about the single insulated conductor.

In the use of the cable, one end of the armor is connected to the outlet box in the usual manner, and the ends of the conductors 2 and 7 are connected to the two terminals or binding posts, one of which (the negative) need not be insulated from the box.

While the return wire is preferably a copper wire, the invention is not necessarily limited in this respect, provided the return wire and the armor have a combined carrying capacity at least equal to the carrying capacitiy of the positive conductor.

The typical form of the invention is a cable containing a single insulated positive wire, but the invention is equally applicable to cables containing two or more insulated positive wires or conductors, for one or another of which the wire 7, or this wire plus the armor, serves as the negative or return side of the circuit.

I claim:

1. A cable comprising a single insulated conductor, a flexible armor consisting of a metal strip wound helically about said insulated conductor with its convolutions overlapping and of interlocking formation, said armor providing a helical groove in its inner surface, and a bare return wire disposed helically in said groove, said return wire being of a cross-section which presents a flattened surface to the insulation.

2. A cable comprising a single insulated conductor, a flexible armor consisting of a metal strip wound helically about said insulated conductor with its convolutions overlapping and of interlocking formation, said armor providing a helical groove in its inner surface, and a bare return wire of approximately triangular cross-section disposed helically in said groove.

GUSTAVE A. JOHNSON.